United States Patent
Wang et al.

(10) Patent No.: US 8,110,299 B2
(45) Date of Patent: Feb. 7, 2012

(54) GRANULAR PERPENDICULAR MEDIA INTERLAYER FOR A STORAGE DEVICE

(75) Inventors: Shoutao Wang, Fremont, CA (US);
Weilu Xu, San Jose, CA (US);
Chunghee Chang, Fremont, CA (US);
Xiaoguang Ma, Fremont, CA (US);
Mark Johnson, San Ramon, CA (US);
Abebe Hailu, San Jose, CA (US);
Charles Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 112 days.

(21) Appl. No.: 12/395,619

(22) Filed: Feb. 27, 2009

(65) Prior Publication Data
US 2010/0221580 A1    Sep. 2, 2010

(51) Int. Cl.
*G11B 5/66* (2006.01)
(52) U.S. Cl. .................. 428/831.2; 427/131
(58) Field of Classification Search .......... None
See application file for complete search history.

(56) References Cited

U.S. PATENT DOCUMENTS

| | | | |
|---|---|---|---|
| 2007/0026261 A1* | 2/2007 | Marinero et al. | 428/831.2 |
| 2007/0026262 A1* | 2/2007 | Maeda | 428/831.2 |
| 2008/0204933 A1* | 8/2008 | Hailu et al. | 360/135 |

OTHER PUBLICATIONS
U.S. Appl. No. 12/178,375, filed Jul. 23, 2008.

* cited by examiner

*Primary Examiner* — Holly Rickman (57) ABSTRACT

An apparatus and method are provided for improving perpendicular magnetic recording media. The present invention provides media, and a method of fabricating media in a cost-effective manner, with a reduced ruthenium (Ru) content interlayer structure, while meeting media performance requirements. A perpendicular magnetic recording medium is provided comprising a non-magnetic substrate having a surface, and a layer stack situated on the substrate surface. The layer stack comprises, in overlying sequence from the substrate surface a magnetically soft underlayer; an amorphous or crystalline, non-magnetic seed layer; an interlayer structure for crystallographically orienting a layer of a perpendicular magnetic recording material situated on the underlayer; and at least one crystallographically oriented, magnetically hard, perpendicular magnetic recording layer situated on the interlayer structure. The interlayer structure is a stacked structure comprising, in overlying sequence: a chromium alloy situated on the seed layer; and an upper interlayer situated on the chromium alloy.

18 Claims, 7 Drawing Sheets

GALAXY_69-Gen41 G7A2410A, 205R2100, 205R2085, 205R2115 & 205R2130 Parametrics Test Data - MD

| DISK_NUM | Media_Config | HD_NUM | WR_CUR | HFA_AVG | LFA_AVG | RESOLUTION | TW65 | FWD_OVW | RVS_OVW | PE_EFL | OTC_EFL | PE_EFL_NORM | WR_WDT | WPE_AVG | MOD | Ru Thickness |
|---|---|---|---|---|---|---|---|---|---|---|---|---|---|---|---|---|
| CTRL-1A | GN2.2 | CM149 | 100.00 | 3417.46 | 5810.77 | 0.59 | 2.10 | -37.63 | -44.47 | -6.24 | -5.86 | -6.78 | 5.66 | 6.14 | 6.82 | |
| REF-WE609365AG_7A | GN2.2 | CM149 | 100.00 | 3129.54 | 5345.40 | 0.59 | 2.09 | -38.83 | -45.31 | -6.60 | -6.00 | -6.82 | 5.76 | 6.48 | 4.29 | 130A |
| SEC-G7012_3_2B | GN1.0 | CM149 | 100.00 | 3359.71 | 5798.65 | 0.58 | 2.10 | -37.24 | -43.29 | -6.76 | -6.13 | -7.32 | 5.67 | 6.27 | 4.32 | 200A |
| THD-WY7F10_001_3B | GN4.1 | CM149 | 100.00 | 3647.45 | 6248.09 | 0.58 | 2.02 | -38.02 | -43.35 | -6.41 | -6.09 | -6.85 | 5.78 | 6.22 | 4.20 | |
| 205R2085-1A | GN4.1 | CM149 | 100.00 | 3710.31 | 6278.34 | 0.59 | 1.97 | -38.17 | -48.89 | -6.92 | -6.46 | -7.16 | 5.85 | 6.39 | 3.14 | 50A |
| 205R2085-1B | GN4.1 | CM149 | 100.00 | 3743.85 | 6300.47 | 0.59 | 1.99 | -38.07 | -48.35 | -7.06 | -6.61 | -7.45 | 5.84 | 6.32 | 4.31 | |
| 205R2100-1A | GN4.1 | CM149 | 100.00 | 3725.36 | 6218.38 | 0.60 | 1.96 | -38.29 | -49.15 | -7.02 | -6.51 | -7.37 | 5.84 | 6.36 | 3.37 | 60A |
| 205R2100-1B | GN4.1 | CM149 | 100.00 | 3753.47 | 6270.13 | 0.60 | 1.96 | -38.18 | -48.84 | -7.30 | -6.72 | -7.64 | 5.82 | 6.37 | 3.63 | |
| 205R2115-1A | GN4.1 | CM149 | 100.00 | 3724.21 | 6166.92 | 0.60 | 1.95 | -38.65 | -49.59 | -7.27 | -6.50 | -7.48 | 5.87 | 6.44 | 4.03 | 70A |
| 205R2115-1B | GN4.1 | CM149 | 100.00 | 3739.18 | 6192.80 | 0.60 | 1.96 | -38.57 | -49.42 | -7.27 | -6.75 | -7.67 | 5.83 | 6.33 | 3.37 | |
| 205R2130-1A | GN4.1 | CM149 | 100.00 | 3737.21 | 6133.72 | 0.61 | 1.94 | -38.61 | -49.72 | -7.26 | -6.47 | -7.47 | 5.85 | 6.41 | 3.73 | 80A |
| 205R2130-1B | GN4.1 | CM149 | 100.00 | 3787.04 | 6164.73 | 0.61 | 1.96 | -38.50 | -49.35 | -7.14 | -6.54 | -7.53 | 5.82 | 6.39 | 4.05 | POR |
| CTRL-1A | GN2.2 | CM149 | 100.00 | 3365.95 | 5747.55 | 0.59 | 2.09 | -37.66 | -44.39 | -6.24 | -5.85 | -6.71 | 5.70 | 6.21 | 5.26 | |

GRANULAR PERPENDICULAR MEDIA INTERLAYER FOR A STORAGE DEVICE

BACKGROUND

Magnetic storage media, the storage of data on magnetized media, is widely used in various applications, particularly in the computer industry for data storage and retrieval applications, as well as for storage of audio and video signals. Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs.

Magnetic thin-film media, wherein a fine grained polycrystalline magnetic alloy layer serves as the active recording medium layer, are generally classified as "longitudinal" or "perpendicular," depending on the orientation of the magnetization of the magnetic domains of the grains of the magnetic material. In longitudinal media (also often referred as "conventional" media), the magnetization in the bits is flipped between lying parallel and anti-parallel to the direction in which the head is moving relative to the disc. Perpendicular magnetic recording media are being developed for higher density recording as compared to longitudinal media. The thin-film perpendicular magnetic recording medium comprises a substrate and a magnetic layer having perpendicular magnetic anisotropy. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

Figure 1:
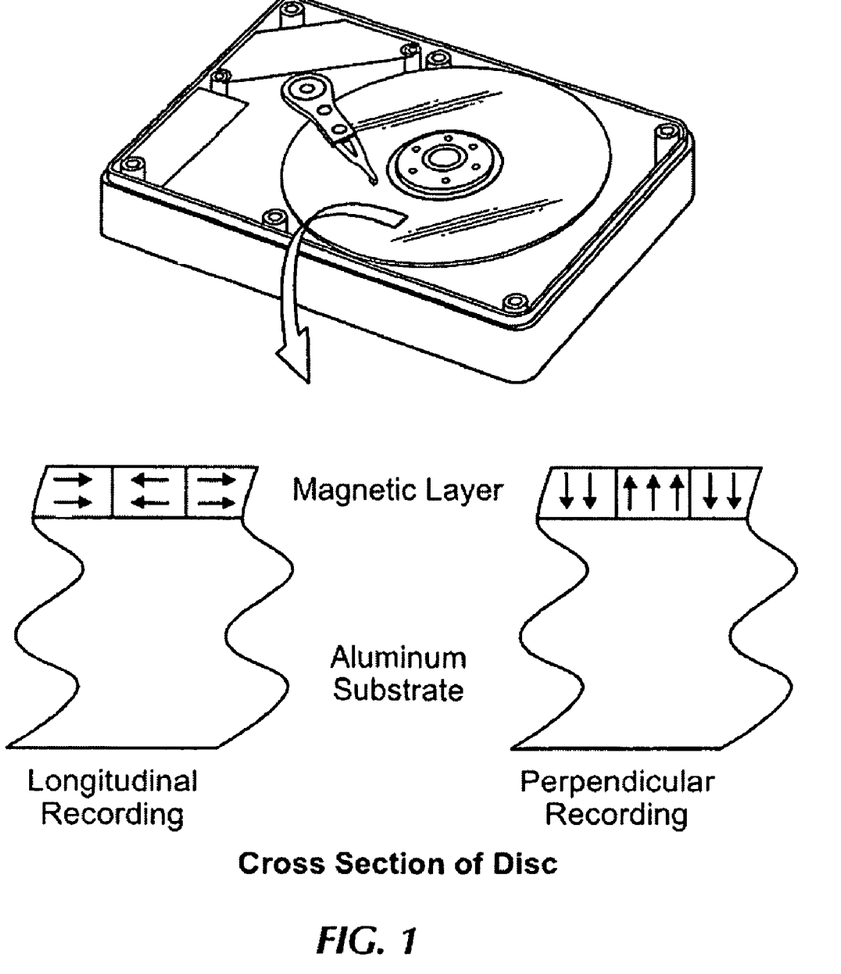
FIG. 1 is a perspective view of a typical disc drive data storage system in which the present invention is useful, and also a disc recording medium and a cross section of a disc showing the difference between longitudinal and perpendicular magnetic recording.

Referring to the drawings wherein identical reference numerals denote the same elements throughout the various views, FIG. 1 illustrates a perspective view of a typical disc drive data storage system in which the present invention is useful, and also a disc recording medium and a cross section of a disc showing the difference between longitudinal and perpendicular magnetic recording. Although FIG. 1 shows one side of the disc, magnetic recording layers are usually sputter deposited on both sides of the non-magnetic aluminum substrate of FIG. 1. Also, although FIG. 1 shows an aluminum substrate, other embodiments include a substrate made of glass, glass-ceramic, aluminum/NiP, metal alloys, plastic/polymer material, ceramic, glass-polymer, composite materials or other non-magnetic materials.

While perpendicular media technology provides higher areal density capability over longitudinal media, granular perpendicular magnetic recording media is being developed for further extending the areal density as compared to conventional (non-granular) perpendicular magnetic recording, which is limited by the existence of strong lateral exchange coupling between magnetic grains. Granular structure provides better grain isolation through oxide segregation to grain boundary, hence enhancing grain to grain magnetic decoupling and increasing media signal to noise ratio (SNR).

A granular perpendicular magnetic layer contains magnetic columnar grains separated by grain boundaries comprising a dielectric material such as oxides, nitrides or carbides to decouple the magnetic grains. The grain boundaries, having a thickness of about 2 Å to about 30 Å, provide a substantial reduction in the magnetic interaction between the magnetic grains. In contrast to conventional perpendicular media, wherein the longitudinal magnetic layer is typically sputtered at low pressures and high temperatures in the presence of an inert gas, such as argon (Ar), deposition of the granular perpendicular magnetic layer is conducted at relatively high pressures and low temperatures and utilizes a reactive sputtering technique wherein oxygen ($O_2$), CxHy, and/or nitrogen ($N_2$) are introduced in a gas mixture of, for example, Ar and $O_2$, Ar and CxHy, Ar and $N_2$, or Ar and $O_2$, CxHy, and $N_2$. Alternatively, oxide, carbide or nitrides may be introduced by utilizing a sputter target comprising oxides, carbides and/or nitrides which is sputtered in the presence of an inert gas (i.e., Ar), or, optionally, may be sputtered in the presence of a sputtering gas comprising $O_2$, CxHy, and/or $N_2$ with or without the presence of an inert gas. The introduction of $O_2$, CxHy, and/or $N_2$ reactive gases, and oxides, carbides, and/or nitrides inside targets provides oxides, carbides, and/or nitrides that migrate into the grain boundaries, thereby providing a granular perpendicular structure having a reduced lateral exchange coupling between grains.

SUMMARY

An apparatus and method are described herein for improving perpendicular magnetic recording media. The present invention provides media, and a method of fabricating media in a cost-effective manner, with a reduced ruthenium (Ru) content interlayer structure, while meeting media performance requirements. A perpendicular magnetic recording medium is provided comprising a non-magnetic substrate having a surface, and a layer stack situated on the substrate surface. The layer stack comprises, in overlying sequence from the substrate surface a magnetically soft underlayer; an amorphous or crystalline, non-magnetic seed layer; an interlayer structure for crystallographically orienting a layer of a perpendicular magnetic recording material situated on the underlayer; and at least one crystallographically oriented, magnetically hard, perpendicular magnetic recording layer situated on the interlayer structure. The interlayer structure is a stacked structure comprising, in overlying sequence: a chromium alloy situated on the seed layer; and an upper interlayer situated on the chromium alloy. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 7 is a table illustrating examples of parametric testing results of media utilizing a conventional ruthenium interlayer, versus media utilizing an interlayer in accordance with an embodiment of the present invention.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method are described herein for improving perpendicular magnetic recording media. The present invention provides media, and a method of fabricating media in a cost-effective manner, with a reduced ruthenium (Ru) content interlayer structure, while meeting media performance requirements. Highly oriented crystal growth and ultra-high areal recording density media is facilitated, while maintaining full compatibility with the economic requirements of cost-effective, large-scale, automated manufacturing technology.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings.

Reference is made herewith to U.S. patent application Ser. No. 11/709,822, filed Feb. 23, 2007, Titled: Granular Perpendicular Magnetic Recording Media with Multi-Interlayer Structure; and to U.S. patent application Ser. No. 12/178,375, filed Jul. 23, 2008, Titled: Nickel Based Alloys As Crystal Growth Enhancing And Mechanical Strengthening Layer For Perpendicular Recording Media, each of which are assigned to the Assignee of this invention and are incorporated herein by reference.

Figure 2:
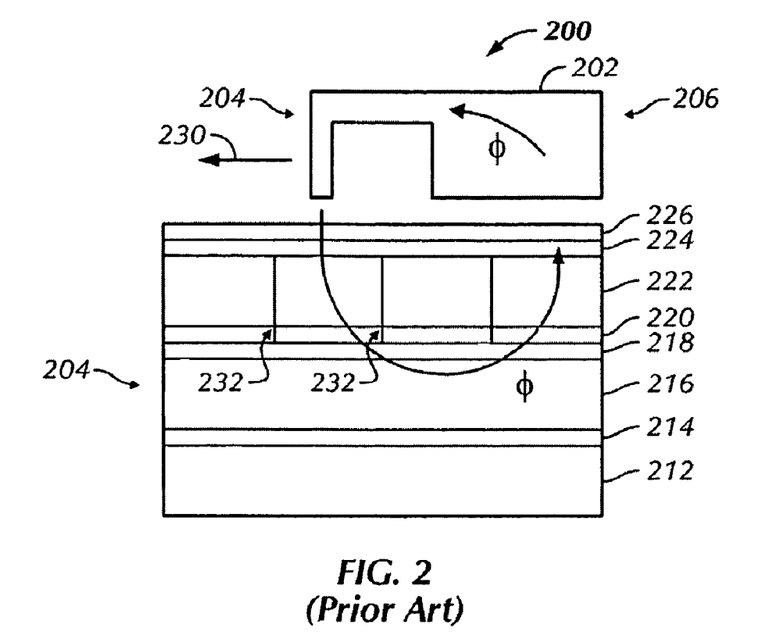
FIG. 2 is a simplified cross-sectional view of a portion of a conventional granular perpendicular magnetic recording medium, and retrieval system including a single-pole transducer head, as can be used in the disc drive data storage system as in FIG. 1.

Referring to FIG. 2, a simplified cross-sectional view is illustrated of a portion of a conventional granular perpendicular magnetic recording medium, and retrieval system including a single-pole transducer head, as can be used in the disc drive data storage system 110 of FIG. 1. A typical conventional perpendicular recording system 200 is illustrated utilizing a vertically oriented magnetic medium 210 with a relatively thick soft magnetic underlayer 216, at least one relatively thin hard perpendicular magnetic recording layer 222 with its magnetic easy axis perpendicular to the film plane, and a magnetic transducer head 202, wherein reference numerals 212, 214, 218, and 220, respectively, indicate a non-magnetic substrate, an optional adhesion layer, a seed layer, and at least one non-magnetic interlayer. Reference numerals 204 and 206, respectively, indicate the main (writing) and auxiliary poles of the magnetic transducer head 202. The relatively thin interlayer 220, comprised of one or more layers of non-magnetic materials, serves to i) prevent magnetic interaction between the soft underlayer 216 and the at least one hard recording layer 222; and ii) promote desired microstructural and magnetic properties of the at least one magnetically hard recording layer.

As shown by the arrows indicating the path of the magnetic flux $\Phi$, flux $\Phi$ is seen as emanating from the main writing pole 204 of magnetic transducer head 202, entering and passing through the at least one vertically oriented, magnetically hard recording layer 220 in the region below main pole 204, entering and traveling within soft magnetic underlayer (SUL) 216 for a distance, and then exiting therefrom and passing through the at least one perpendicular hard magnetic recording layer 222 in the region below auxiliary pole 206 of transducer head 202. The direction of movement of perpendicular magnetic medium 210 past transducer head 202 is indicated in the figure by the arrow 230 above medium 210.

With continued reference to FIG. 2, vertical lines 232 indicate grain boundaries of polycrystalline layers 220 and 222 of the layer stack constituting medium 210. Magnetically hard main recording layer 222 is formed on interlayer 220, and while the grains of each polycrystalline layer may be of differing widths (as measured in a horizontal direction) represented by a grain size distribution, they are generally in vertical registry (i.e., vertically "correlated" or aligned).

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (i.e., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (i.e., $O_2$, $N_2$, $CO_2$, etc.) to the inert gas (i.e., Ar) atmosphere during sputter deposition of the Co alloy-based magnetic layer. The latter process does not require heating of the substrate to an elevated temperature.

Magnetic recording media with granular magnetic recording layers possess great potential for achieving very high and ultra-high areal recording densities. An advantage afforded by granular recording layers is significant suppression of media noise due to great reduction in the exchange coupling between adjacent magnetic grains, resulting from the presence of non-magnetic material, typically an oxide material, at the grain boundaries. Current methodology for manufacturing granular-type magnetic recording media involves reactive sputtering of a target comprised of the ferromagnetic material for the magnetic recording layer (typically a Co-based alloy) in a reactive gas-containing atmosphere, i.e., an atmosphere comprising oxygen or a compound of oxygen, in order to incorporate oxides in the deposited film or layer and achieve smaller and more isolated magnetic grains. Alternatively, a target comprised of the ferromagnetic material (typically a Co-based alloy) and the oxide material may be directly sputtered in an inert atmosphere or an atmosphere comprising oxygen or a compound of oxygen.

As indicated above, perpendicular magnetic recording media typically include at least one magnetically soft underlayer for guiding magnetic flux through the media and to enhance writability, at least one non-magnetic intermediate or interlayer (hereinafter referred to as "interlayer"), and at least one main recording layer. The role of the interlayer(s) is critical for obtaining good media performance. Specifically, in perpendicular magnetic recording media the interlayer(s) serve to provide:

1. control of the crystallographic orientation of the main recording layer(s);
2. control of the grain size and grain distribution of the main recording layer(s);
3. destruction of exchange coupling between magnetically hard recording layers and magnetically soft layers; and
4. physical separation between adjacent grains of the main recording layer(s), which feature is particularly desirable and important when the latter is formed by a low temperature, high gas pressure sputtering process, and/or by a reactive sputtering process, so that an oxide, i.e., Co-oxide, occurs in the boundaries between adjacent grains.

More specifically, the media signal-to-noise ratio (SMNR) of perpendicular magnetic recording media is improved by increasing the strength of the c-axis out-of-plane orientation of the perpendicular main recording layer(s) while maintaining a small uniform grain size of the layer(s). The preferred orientation of the magnetic layer(s) depends upon the structural properties of and the interactions between the various previously deposited underlying layers of the media, as well as upon the nature of the substrate.

In general, control of the strength (or amount) of the orientation of thin-film layers is difficult. Formation of a Co-alloy magnetic recording layer with a strong <0002> growth orientation on a structure including a substrate, a soft magnetic underlayer, and non-magnetic seed and interlayers between about 0.2 and 40 nm thick is extremely difficult.

Differences in crystallographic orientation between adjacent thin film layers are affected by the surface and interfacial energies of the materials of the layers, and by heteroepitaxial (or coherent) growth of one layer upon another layer of a chemically incompatible material with related crystal lattice structure and atomic interplanar spacings.

The soft magnetic underlayer of perpendicular magnetic recording media generally is composed of a small grain or amorphous material containing at least one of Fe and Co. According to prior practice, a non-magnetic material of hexagonal close-packed (hcp) structure, i.e., Ru, may be deposited on the soft magnetic underlayer, which non-magnetic hcp material grows with a moderately strong <0002> orientation and small grain size. A magnetic material of hcp structure, typically a Co-based alloy, may grow coherently on the hcp non-magnetic layer, also with <0002> growth orientation and small grain size. The quality of the <0002> growth orientation can be determined from the size of symmetric X-ray diffraction ("XRD") peaks and rocking curves. Strong growth orientation of the Co-based alloy with the hcp <0002> axis out-of-plane is generally necessary for achieving good performance of high areal recording density perpendicular magnetic media.

Efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 1 kOe, such as of a NiFe alloy (Permalloy), between a non-magnetic substrate, i.e., of glass, aluminum (Al) or an Al-based alloy, and a magnetically "hard" recording layer having relatively high coercivity, typically about 3-8 kOe, i.e., of a cobalt-based alloy (i.e., a Co—Cr alloy such as CoCrPtB) having perpendicular anisotropy. The magnetically soft underlayer serves to guide magnetic flux emanating from the head through the magnetically hard perpendicular recording layer.

Completing the layer stack is a protective overcoat layer 224, such as of a diamond-like carbon (DLC), formed over hard magnetic layer 222, and a lubricant topcoat layer 226, such as of a perfluoropolyether (PFPE) material, formed over the protective overcoat layer 224.

Figure 3:
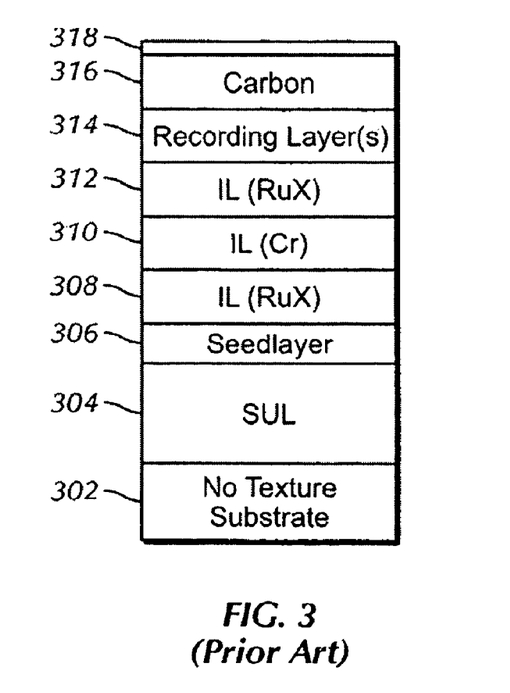
FIG. 3 is a simplified cross-sectional view of a portion of a perpendicular magnetic recording medium including a stacked interlayer structure according to an embodiment of U.S. patent application Ser. No. 11/709,822.

Referring now to FIG. 3, illustrated herein, in simplified cross-sectional view, is a portion of a perpendicular magnetic recording medium 300 according to an embodiment of the aforementioned U.S. patent application Ser. No. 11/709,822. The perpendicular magnetic recording medium 300 shown in FIG. 3 comprises a series of thin-film layers arranged in an overlying (stacked) sequence on a non-magnetic substrate 302. Perpendicular magnetic recording medium 300 further includes a soft magnetic underlayer 304, an amorphous or crystalline seed layer 306, and a non-magnetic interlayer structure (308, 310, 312). In the stacked interlayer structure example shown, ruthenium (Ru) is utilized in stacked interlayers 308 and 312, while (Y) is utilized for interlayer 310. Interlayer 308 is an Ru-containing material, from about 0.5 to about 50 nm thick, and comprised of a non-magnetic material of general formula RuX, wherein X is at least one element selected from the group consisting of: Mo, Ni, Cr, W, Zr, and Re. Interlayer 310 is a non-magnetic material not containing Ru, from about 0.5 to about 80 nm thick. Interlayer 310 (Y) is at least one element or alloy selected from the group consisting of: Mo, Cr, Ni, Ti, W, Zr, CrMo, CrW, CrMoZr, and NiMo. Interlayer 312 is an Ru-containing material from about 0.5 to about 50 nm thick, and comprised of an Ru-containing non-magnetic material selected from the group consisting of: Ru, RuCr, RuMo, and RuW. Next, overlying the interlayer structure is a perpendicularly oriented, magnetically hard (main) granular recording layer 314, a protective overcoat layer 316, typically comprised of a carbon-containing material <100 angstrom thick, such as diamond-like carbon (DLC), and a lubricant topcoat layer 318, typically comprised of a perfluoropolyether compound <50 angstrom thick.

Figure 4:
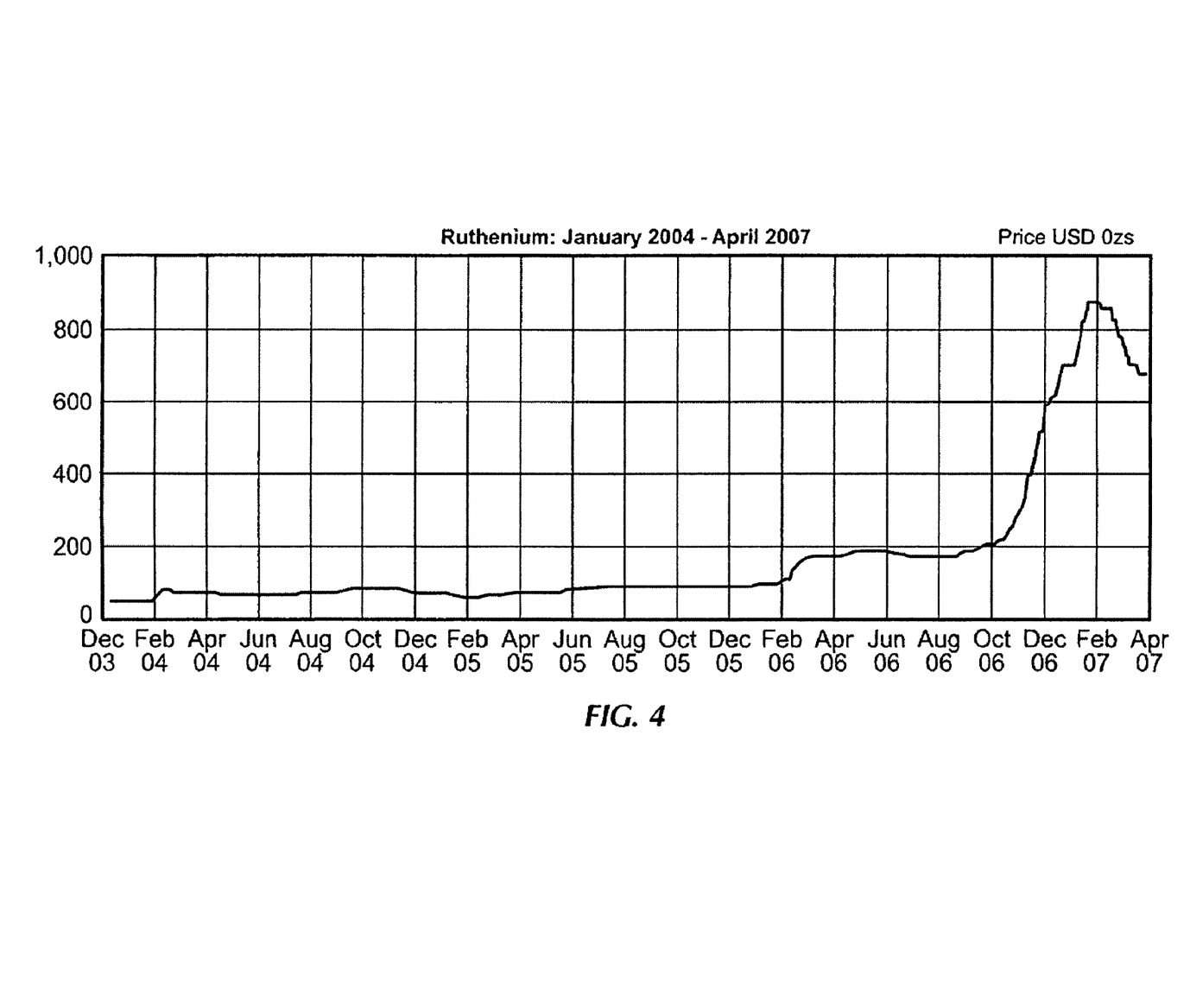
FIG. 4 is a graphical illustration of the escalating price of the element Ruthenium, shown per ounce, over time, since at least December 2003.

Turning now to FIG. 4, a graph illustrates the escalating price of the element Ruthenium, shown per ounce, over time, since at least December 2003. Ruthenium is a rare transition metal of the platinum group of the periodic table. As may be observed, the price of ruthenium greatly increased in the year 2006. The high cost of ruthenium thus presents an obstacle attendant upon the design and manufacture of improved film or layer structures for facilitating highly oriented crystal growth and fabrication of high performance, ultra-high areal recording density granular perpendicular magnetic recording media, while maintaining full compatibility with the economic requirements of cost-effective, large-scale, automated manufacturing technology. The present invention utilizes a thinner (reduced content) ruthenium-based media interlayer, while meeting media performance requirements.

Figure 5:
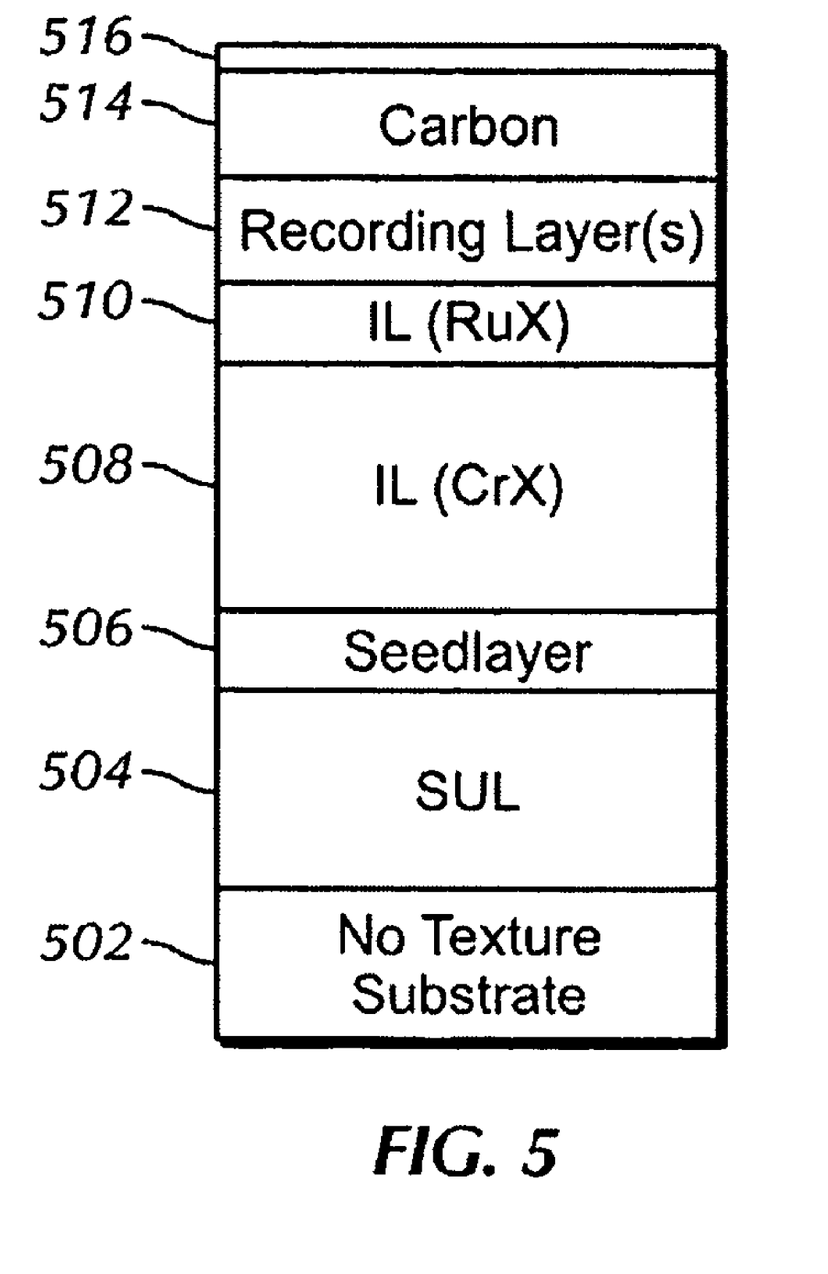
FIG. 5 is a simplified cross-sectional view of a portion of a perpendicular magnetic recording medium including a stacked interlayer structure, in accordance with an embodiment of the present invention.

FIG. 5 illustrates a simplified cross-sectional view of a portion of a perpendicular magnetic recording medium including a stacked interlayer structure, in accordance with an embodiment of the present invention. Clearly, features of the discussion and claims are not limited to this particular design, which is shown only for purposes of the example.

The perpendicular magnetic recording medium 500 comprises a series of thin-film layers arranged in an overlying (stacked) sequence on a suitable non-magnetic substrate. As an example, substrate 502 is an aluminum substrate, or a substrate made of glass, glass-ceramic, aluminum/NiP, metal alloys, plastic/polymer material, ceramic, glass-polymer, composite materials or other non-magnetic materials. A magnetically "soft" underlayer 504 (SUL) is positioned on the substrate, and is, for example, a magnetic layer having a relatively low coercivity below about 1 kOe, such as of a NiFe alloy (permalloy). SUL 504 can be composed of a small grain or amorphous material containing at least one of Fe and Co. Optionally, an adhesion layer (not shown), i.e., Ti alloy, can be used between the substrate 502 and underlayer 504 for strengthening the attachment of the functional layers to the substrate 502. Seedlayer 506 is used to prepare and enhance crystal growth of the interlayers (508, 510). Seed layer 506 can be crystalline or amorphous (i.e., Ta and Ta alloys) and/or FCC materials (i.e., Cu, Au, and Ag), or a nickel based FCC phase alloy. Interlayers 508 and 510 grow hcp <002> orientations to serve as templates for perpendicular growth of magnetic alloys, and is, for example, a body centered cubic (BCC) structure. At least one crystallographically oriented, magnetically hard, perpendicular magnetic recording layer is situated on the interlayer structure 508 and 510. In an embodiment, the magnetic recording layer 512 is a granular layer wherein adjacent grains thereof are physically separated, and the magnetic recording layer 512 has a hexagonal close-packed (hcp) crystal lattice with a <200> out-of-plane growth orientation. In an embodiment, recording layer 512 has a relatively high coercivity, about 3-8 kOe, i.e., of a cobalt-based alloy (i.e., a Co—Cr alloy such as CoCrPtB, or CoPt) having perpendicular anisotropy. Protective overcoat 514 is comprised of a carbon-containing material <100 angstrom thick, such as diamond-like carbon (DLC). Lubricant topcoat 516 is comprised of a perfluoropolyether compound <50 angstrom thick.

Interlayers 508 and 510 are utilized for crystallographically orienting a layer of a perpendicular magnetic recording material 512 situated on the underlayer 504. The interlayer structure is a stacked structure including, in overlying sequence a chromium alloy 508 situated on the seed layer 506, and an upper interlayer 510 (i.e., ruthenium alloy) situated on the chromium alloy 508. In an embodiment, ruthenium alloy is limited to the upper interlayer 510, and is used as a top flash layer, about 2 to 7 nm thick, or less than 20 nm thick. To create a hexagonal close-packed interface for epitaxial growth of the magnetic recording layer 512, the upper interlayer ruthenium alloy is, for example, about 2 nm to about 7 nm thick. In an embodiment, the chromium alloy 508 is of a general formula CrX, wherein X is at least one element selected from the group comprising: Mo, W, Co, Zr, V, Ta, $TiO_\beta$, $SiO_\beta$, $WO_\beta$, $NbO_\beta$, and $TaO_\beta$, and wherein in $\beta$ has a value between 2 and 3. In another embodiment, the chromium alloy 508 is of a general formula CrX, wherein X is at least one element selected from the group limited to: Mo, W, Co, Zr, V, Ta, $TiO_\beta$, $SiO_\beta$, $WO_\beta$, $NbO_\beta$, and $TaO_\beta$, and wherein $\beta$ has a value between 2 and 3. As an example, the chromium alloy 508 is about 1 nm to about 15 nm thick.

In an embodiment, the present invention provides a smooth-surfaced first interlayer of a dual-layer interlayer structure, i.e., an interlayer structure comprised of a first crystalline interlayer of a non-magnetic material formed by sputter deposition in a gas atmosphere at a first pressure, and a second crystalline interlayer of a non-magnetic material formed by sputter deposition in a gas atmosphere at a second pressure greater than the first pressure, which interlayer structure promotes and strengthens a desired out-of-plane crystallographic growth orientation of the perpendicular magnetic recording layer deposited thereon. When fabricated in this manner, no sharp transition or interface is formed between the first and second interlayers. The above-described hcp structured interlayer media also demonstrates, in an embodiment, significant improvement or at least no degradation in bit error rate ("BER") and media signal-to-noise ratio ("SMNR") over conventional interlayer media.

The above layered structure of an embodiment is an exemplary structure. In other embodiments, the layered structure could be different with either less or more layers than those stated above.

The present invention additionally provides methods of manufacturing a perpendicular magnetic recording medium. The methods described are provided as examples only, and not meant to be limiting to the present invention. Those of ordinary skill in the art will appreciate that various changes and modifications can be made to these methods, while remaining within the scope of the appended claims.

Almost all the manufacturing of a disc media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media can be a static sputter system or a pass-by system, where all the layers except the lubricant are deposited sequentially inside a suitable vacuum environment.

The present invention method of manufacturing a perpendicular magnetic recording medium includes forming a layer stack on a non-magnetic substrate surface. The layer stack includes, in overlying sequence from the substrate surface: i.) a magnetically soft underlayer; ii.) an amorphous or crystalline, non-magnetic seed layer; iii.) an interlayer structure for crystallographically orienting a layer of a perpendicular magnetic recording material situated on the underlayer; and iv.) at least one crystallographically oriented, magnetically hard, perpendicular magnetic recording layer situated on the interlayer structure. Forming the interlayer structure comprises forming in overlying sequence: i.) a chromium alloy situated on the seed layer; and ii.) an upper interlayer situated on the chromium alloy. In an example, the upper interlayer is formed with a ruthenium alloy. Optionally, the upper interlayer ruthenium alloy is formed at about 2 nm to about 7 nm thick, to create a hexagonal close-packed interface with <0002> growth orientation for epitaxial growth of the magnetic recording layer. In an embodiment, the chromium alloy is of a general formula CrX, wherein X is at least one element selected from the group comprising: Mo, W, Co, Zr, V, Ta, $TiO_\beta$, $SiO_\beta$, $WO_\beta$, $NbO_\beta$, and $TaO_\beta$, and wherein in $\beta$ has a value between 2 and 3. In another embodiment, the chromium alloy is of a general formula CrX, wherein X is at least one element selected from the group limited to: Mo, W, Co, Zr, V, Ta, $TiO_\beta$, $SiO_\beta$, $WO_\beta$, $NbO_\beta$, and $TaO_\beta$, and wherein $\beta$ has a value between 2 and 3. In an example, the chromium alloy is sputter deposited at a pressure ranging from 0.5 mtorr to 120 mtorr.

Each of the layers constituting magnetic recording media of the present invention, except for a carbon overcoat and a lubricant topcoat layer, may be deposited or otherwise formed by any suitable physical vapor deposition technique (PVD), i.e., sputtering, or by a combination of PVD techniques, i.e., sputtering, vacuum evaporation, etc. The carbon overcoat is typically deposited with sputtering or ion beam deposition. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is an important step in the whole process of creating recording media. Pass-by sputtering and static sputtering may be used for the process. In pass-by sputtering, discs are passed inside a vacuum chamber, where they are deposited with the magnetic and non-magnetic materials that are deposited as one or more layers on the substrate when the discs are moving. Static sputtering uses smaller machines, and each disc is picked up and deposited individually when the discs are not moving. The layers on the disc of the embodiment of this invention can be deposited by static sputtering in a sputter machine. The sputtered layers are deposited in so-called bombs, which are loaded onto the sputtering machine. The bombs are vacuum chambers with targets on either side. The substrate is lifted into the bomb and is deposited with the sputtered material. A layer of lube is applied to the carbon surface as one of the topcoat layers on the disc. Sputtering leads to some particulates formation on the post sputter discs. These particulates must be removed to ensure that they do not lead to scratching between the head and substrate. Once a layer of lube is applied, the substrates move to a buffing stage, where the substrate is polished while it spins around a spindle. The disc is wiped and a clean lube is evenly applied on the surface.

Figure 6:
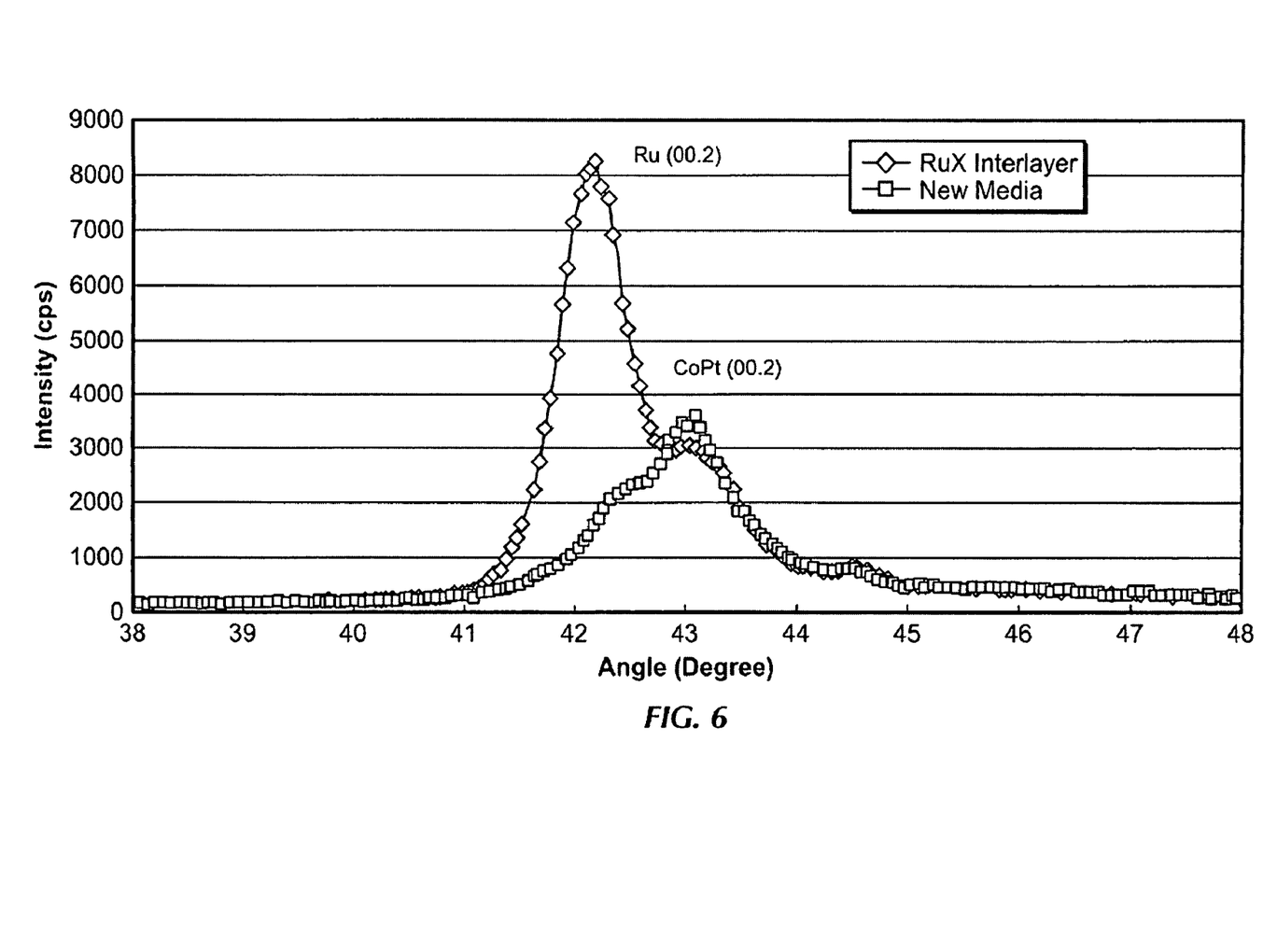
FIG. 6 is a graphical illustration of an XRD graphic spectrum of a comparison of media utilizing a conventional ruthenium interlayer, versus media utilizing an interlayer in accordance with an embodiment of the present invention.

As illustrated graphically in FIG. 6, utilizing an XRD spectrum, a comparison is shown of media utilizing a conventional ruthenium interlayer, versus media utilizing an interlayer in accordance with an embodiment of the present invention. The XRD spectrum plots an x-axis of the angle in degree, against a y-axis of a material intensity in count per second (cps).

As illustrated at about angle 42.2, the conventional media design shows about 8200 cps for the ruthenium peak, whereas the present invention shows about 2000 cps for the ruthenium peak. The ruthenium peak intensity of the present invention is nearly undetectable, and comparatively less than the conventional design. This showing is consistent with the relatively small ruthenium usage of ruthenium in the present invention as compared to conventional media.

Additionally, as illustrated at about angle 43, the magnetic peaks for the convention media design and the present invention design are shown. These magnetic peaks are CoPt peaks of the media recording layer, with the present invention showing about 3800 cps CoPt, and the conventional media design showing slightly less at about 3200 cps CoPt. Thus, the magnetic CoPt peak of the present invention exhibits satisfactory <002> orientation, indicating that the comparative reduction of Ru of the present invention interlayer is not detrimental to the magnetic layer growth perpendicularly in structure. The CoPt <002> peak intensity of the present invention increases due to the overlap with the CrX peak.

FIG. 7 is a table illustrating examples of parametric testing results of media utilizing a conventional ruthenium interlayer, and media utilizing an interlayer in accordance with an embodiment of the present invention such as that illustrated in FIG. 5, wherein:

Media_Config=Media design version;
HFA_AVG=High-Frequency Amplitude Average;
LFA_AVG=Low-Frequency Amplitude Average;
Resolution=HFA_AVG/LFA_AVG;
TW65=65% of the slope of low frequency signal of the head;
FWD_OVM=Forward overwrite;
RVS_OVM=Reverse overwrite;
PE_EFL=Position Error Rate;
OTC_EFL=Off track capability, Squeezed Error Rate;
PE_EFL_NORM=Error Rate normalized;
WR_WDT=Write Width;
WPE_AVG=Write Plus Erase average;
MOD=Modulation of Signal; and
Ru thk=ruthenium thickness.

In particular, the ruthenium thickness is reduced in the table (from top to bottom), and the PE_EFL and OTC_EFL exhibit satisfactory performance of the present invention media, as indicated by the negative PE_EFL numbers. The data of FIG. 7 indicates that granular perpendicular magnetic recording media embodying the stacked interlayer design according to the present invention (i.e., as shown in FIG. 5) is capable of matching the performance of the media with the conventional interlayer design (i.e., as shown in FIG. 3).

Figure 8:
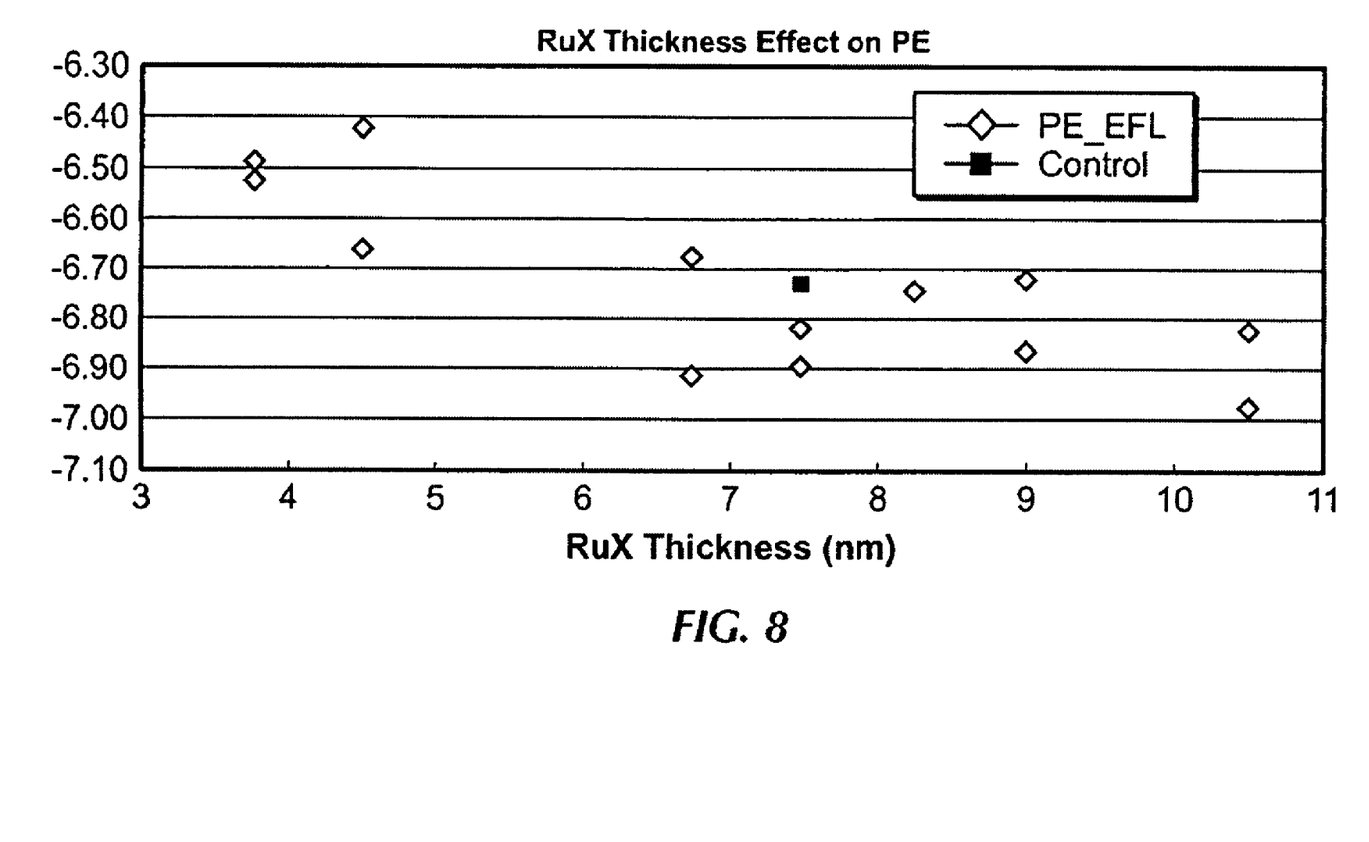
FIG. 8 is a graphical illustration of media performance at various ruthenium interlayer thicknesses, comparing media having a conventional ruthenium interlayer design versus media having an interlayer design in accordance with an embodiment of the present invention.

FIG. 8 is a graphical illustration of media performance at various ruthenium interlayer thicknesses, comparing media having a conventional ruthenium interlayer design versus media having an interlayer design in accordance with an embodiment of the present invention.

The conventional ruthenium interlayer design (control) at about 7.5 ruthenium thickness (more specifically at about 20 nm ruthenium thickness, when all ruthenium interlayers are considered, since 7.5 represents only one ruthenium top layer) shows about −6.72 performance (PE_EFL), whereas the present invention interlayer design (P.I.) at about 7.5 nm shows about −6.82 and −6.90 performance (PE_EFL). Further, the present invention interlayer design (P.I.) having less ruthenium thickness, as compared to the conventional media, exhibits satisfactory performance, even at about 4.5 nm ruthenium thickness. This data indicates that granular perpendicular magnetic recording media embodying the stacked interlayer design according to the present invention (i.e., as shown in FIG. 5) is capable of matching and/or exceeding the performance of the media with the conventional interlayer design (i.e., as shown in FIG. 3), even with a reduced ruthenium thickness or usage.

Modifications and variations may be made to the disclosed embodiments while remaining within the spirit and scope of the invention. The implementations described above and other implementations are within the scope of the following claims.

We claim:

1. A medium comprising:
    a substrate;
    a seed layer overlying the substrate, wherein the seed layer is non-magnetic and comprises a nickel based FCC phase alloy;
    a chromium alloy interlayer in overlying contact with the seed layer;
    an upper interlayer on the chromium alloy interlayer; and
    a perpendicular magnetic recording layer overlying the upper interlayer.

2. The medium as in claim 1, wherein the upper interlayer comprises a ruthenium alloy.

3. The medium as in claim 1, wherein the upper interlayer is about 2 nm to about 7 nm thick, and wherein further the upper interlayer is operable to create a hexagonal close-packed interface for epitaxial growth of the perpendicular magnetic recording layer.

4. The medium as in claim 2, wherein the ruthenium alloy is limited to the upper interlayer, and used as a top flash layer.

5. The medium as in claim 1, wherein the chromium alloy interlayer is of a general formula CrX, wherein X is at least one element selected from the group comprising: Mo, W, Co, Zr, V, Ta, $TiO_\beta$, $SiO_\beta$, $WO_\beta$, $NbO_\beta$, and $TaO_\beta$, and wherein in $\beta$ is within a range of 2 to 3.

6. The medium as in claim 1, wherein the chromium alloy interlayer is of a general formula CrX, wherein X is at least one element selected from the group consisting of: Mo, W, Co, Zr, V, Ta, $TiO_\beta$, $SiO_\beta$, $WO_\beta$, $NbO_\beta$, and $TaO_\beta$, and wherein in $\beta$ is within a range of 2 to 3.

7. The medium as in claim 1, wherein the chromium alloy interlayer is about 1 nm to about 15 nm thick.

8. The medium as in claim 1, wherein the chromium alloy interlayer and the upper interlayer comprise an interlayer structure, and wherein the interlayer structure is a body centered cubic (BCC) structure.

9. The medium as in claim 1, wherein the perpendicular magnetic recording layer is a granular layer comprising physically separated adjacent grains, and wherein further the perpendicular magnetic recording layer has a hexagonal close-packed (hcp) crystal lattice with a <200> out-of-plane growth orientation.

10. A method comprising:
forming a seed layer overlying a substrate, wherein the seed layer is non-magnetic and comprises a nickel based FCC phase alloy;
forming a chromium alloy interlayer in overlying contact with the seed layer;
forming an upper interlayer on the chromium alloy interlayer; and
forming a perpendicular magnetic recording layer overlying the upper interlayer.

11. The method as in claim 10, wherein the upper interlayer is formed with a ruthenium alloy.

12. The method as in claim 10 wherein the upper interlayer is formed at about 2 nm to about 7 nm thick, and wherein the upper interlayer is operable to create a hexagonal close-packed interface with <0002> growth orientation for epitaxial growth of the perpendicular magnetic recording layer.

13. The method as in claim 11, wherein the ruthenium alloy is limited to the upper interlayer, and used as a top flash layer.

14. The method as in claim 10, wherein the chromium alloy interlayer is of a general formula CrX, wherein X is at least one element selected from the group comprising: Mo, W, Co, Zr, V, Ta, $TiO_\beta$, $SiO_\beta$, $WO_\beta$, $NbO_\beta$, and $TaO_\beta$, and wherein in $\beta$ is within a range of 2 to 3.

15. The method as in claim 10, wherein the chromium alloy interlayer is of a general formula CrX, wherein X is at least one element selected from the group consisting of: Mo, W, Co, Zr, V, Ta, $TiO_\beta$, $SiO_\beta$, $WO_\beta$, $NbO_\beta$, and $TaO_\beta$, and wherein in $\beta$ is within a range of 2 to 3.

16. The method as in claim 10, wherein the chromium alloy interlayer is formed at about 1 nm to about 15 nm thick.

17. The method as in claim 10, wherein the chromium alloy interlayer is sputter deposited at a pressure ranging from 0.5 mtorr to 120 mtorr.

18. The method as in claim 10, wherein the chromium alloy interlayer and the upper interlayer comprise an interlayer structure, and wherein the interlayer structure is a body centered cubic (BCC) structure.

* * * * *